March 19, 1957     C. L. BRITTAIN     2,785,624
BARBECUING MACHINE
Filed Aug. 19, 1955     2 Sheets-Sheet 1

INVENTOR.
CLOVIS L. BRITTAIN,
BY
McMorrow, Berman & Davidson
ATTORNEYS.

March 19, 1957 C. L. BRITTAIN 2,785,624
BARBECUING MACHINE
Filed Aug. 19, 1955 2 Sheets-Sheet 2

INVENTOR.
CLOVIS L. BRITTAIN,
BY
McMorrow, Berman + Davidson
ATTORNEYS.

United States Patent Office 2,785,624
Patented Mar. 19, 1957

2,785,624

BARBECUING MACHINE

Clovis L. Brittain, Galena Park, Tex.

Application August 19, 1955, Serial No. 529,484

3 Claims. (Cl. 99—421)

This invention relates to barbecuing or cooking machines, and more particularly has reference to a machine of this type wherein one or more rotating reels are driven by a suitable mechanism, and are adapted to support chickens, hams, and other foods in the path of heat rising from a heat-producing means, to uniformly barbecue, broil, or otherwise cook the same.

In a device of the type stated, it is highly important that the cooked foods not only be efficiently barbecued or otherwise cooked, but also that the entire operation be visible to the maximum extent to potential purchasers of the foods. A machine of the type referred to, accordingly, can be said to have a two-fold purpose, in restaurants and other eating places in which it is proposed to sell large quantities of broiled or barbecued chickens, hams, and other foods.

One important function which a broiling machine as described should discharge is the cooking of the food in such a way as to be highly flavorful, tasty, and tenderly cooked end product. A second function which may appropriately be considered as being of equal importance is the attraction of purchasers, by display of the product during the cooking thereof in such a manner as to arouse in the potential purchaser a desire to partake of the food being cooked.

The main object of the present invention is the provision of a machine which will discharge both of these important functions, first by the proper cooking of the end product, and second, by affording complete visibility, from all four sides of the machine, of all the foods during the cooking thereof, thus to create maximum consumer demand and thereby increase the sale of the cooked products.

As an object corollary to that having regard to the tasty and uniform broiling or barbecuing of the food, it is proposed to so design the rotating reels as to provide an improved self-basting of the food, during the slow rotation thereof within the device. To this end, each reel is equipped with a plurality of radially projecting tubular elements terminating at their outer ends in scoop-like extensions, said elements extending outwardly from a hollow, perforated shaft. Each element, as the reel turns, is so disposed as to cause the scoop-like extension thereof to travel through a sump in which basting juices are accumulated, said juices traveling radially, inwardly of the reel through the tubular elements to the hollow shaft and then dripping through the perforations of the shaft upon the fowl, meats, or other foods being cooked.

Another object of importance is to so form the basting device as to cause the same to be fixedly connected in its entirety to the reel, eliminating moving parts, which have a tendency to malfunction after a period of time, and which, further, are difficult to clean in many instances.

Another object of importance is to provide upon each reel a food-holding means so designed as to securely hold the food in proper place upon the circumference of the reel, where it will receive the maximum benefit from the dripping basting juices, and will not tend to slip or otherwise deviate from its assigned position.

Another object of importance is to so design the device as to permit a plurality of the reels to be mounted in a single, glass-enclosed framework, with all the reels being driven by a single source of motive power, and being arranged in a vertical series such that the hot products of combustion of a charcoal or hickory fire will pass upwardly through the interior of the housing about all of said reels, in such a manner as to cause heat to be applied uniformly to the several chickens, hams, and other foods, to cook the same uniformly and to a proper depth, and impart the maximum flavor and tang thereto.

Another object of importance is to so design the respective reels or spits as to permit the same to be swiftly and easily removed from the supporting framework of the device for cleaning or maintenance purposes.

Yet another object is to so form the driving connection between the motor and the respective reels as to automatically engage or disengage the reels from said connection, responsive to insertion or removal of the reels within the device.

Still another object is to provide a glasspaneled enclosure for a barbecuing machine so designed as to provide access to the interior of each of the reel compartments without opening any other compartment to the surrounding atmosphere.

Still another object is to form the device in such a manner as to permit the foods to be cooked over a charcoal or hickory fire used in combination with a gas burner or electric heating unit, which burner or heating unit can be automatically thermostatically controlled so as to provide a constant cooking or barbecuing temperature both before and after the charcoal or hickory fire has attained its highest intensity.

Still another object is to so design the basting means for the respective reels as to permit a different type of basting juice to be used on the foods carried by one reel, as compared to that used on the foods of the other reel.

Other objects will appear from the following description, the claims appended thereto, and from the annexed drawing, in which like reference characters designate like parts throughout the several views, and wherein:

Figure 4 is a fragmentary perspective view of one of the basting pans; and

Figure 5 is a fragmentary bottom plan view of the top portion of the device, as seen from the line 5—5 of Figure 1.

Figure 1:
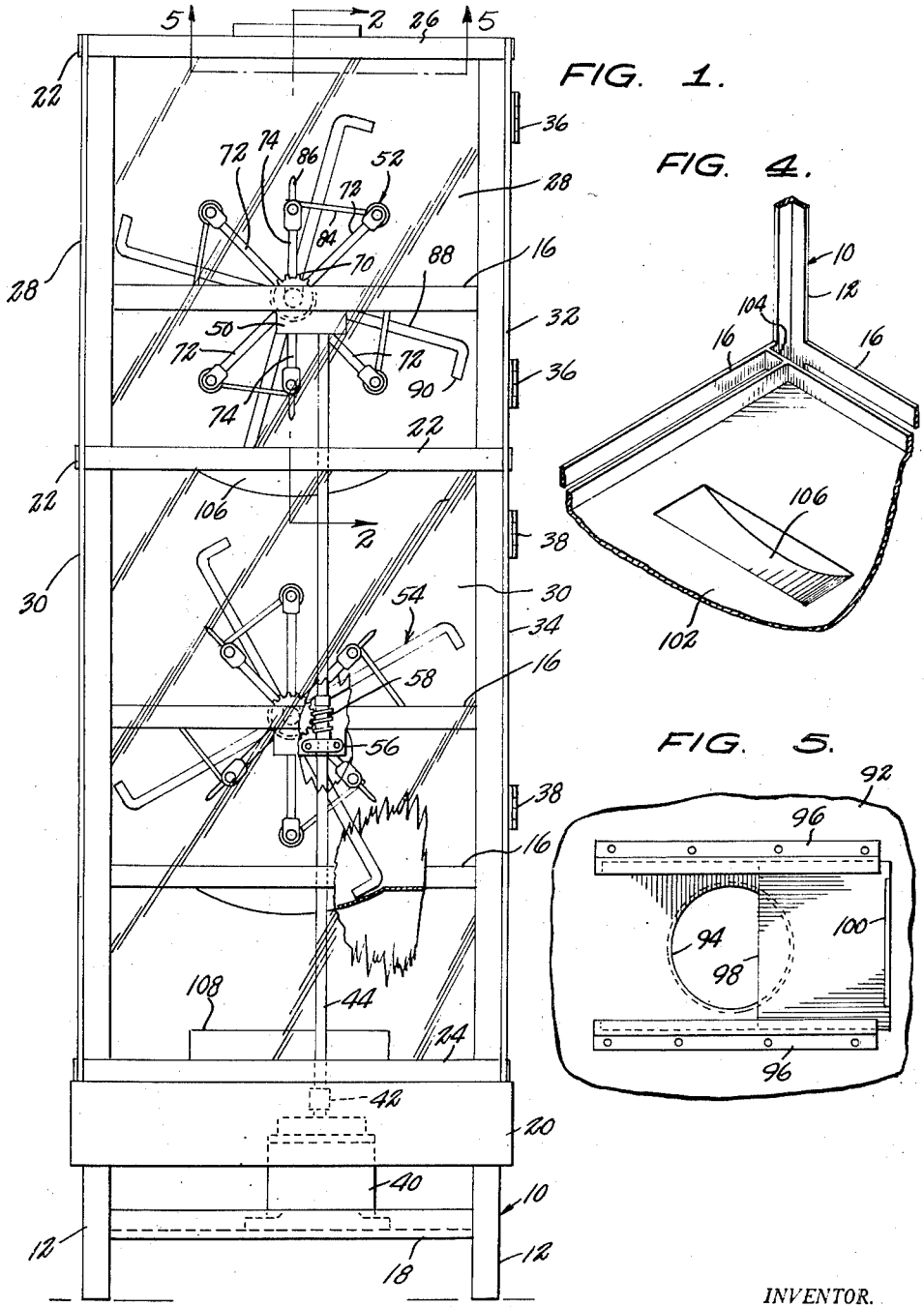
Figure 1 is a side elevational view of a barbecuing machine formed according to the present invention, a portion of the glass side wall being broken away.

The barbecuing machine constituting the present invention includes an open supporting framework, said framework being provided with vertically disposed corner posts 12 welded or otherwise rigidly secured to a horizontally disposed, rectangular upper end frame 14. The corner posts and the upper end frame can be formed of angle members, and to rigidify said framework there are provided, at intervals spaced vertically of the framework, horizontally disposed cross braces 16, welded at their opposite ends to the respective corner posts and extending across the sides and back of the framework.

Adjacent the lower ends of the corner posts, there is provided a bottom end frame 18, and disposed adjacent to and above the bottom end frame, a skirt 20 of insulation material extends about the framework.

The framework is enclosed at all sides thereof, fully from the skirt to the upper end of the frame, by glass, so as to afford maximum visibility of the products being cooked. The device, in this connection, has a plurality of doors at the front thereof, with said doors being constructed in a manner to be made presently apparent. At the sides and back, there are secured to selected cross braces 16 (see Figure 2) glass retaining strips 22, each having upwardly and downwardly facing grooves. Immediately above the skirt 20, there is a bottom glass retaining strip 24 at each side and at the back of the device, having an upwardly facing groove. At the upper end of the frame, there is provided a top glass panel retaining strip 26, formed with a downwardly facing groove. Engaged in the grooves of the several strips are upper glass panels 28, at the sides and back of the device, and engaged between the strips 22 and the bottom retaining strips 24 are lower glass panels 30.

An upper door has been designated at 32, and provides access to an upper reel compartment. A lower door 34 similarly provides access to a lower reel compartment, the doors 32, 34 being hingedly connected to the framework at one side thereof by hinges 36, 38 respectively and being, of course, equipped with suitable latch devices, not shown.

Supported in an upstanding position upon the lower end frame 18 is an electric motor 40, the shaft of which extends into a housing containing a suitable reduction gearing. A stub shaft projects upwardly from said housing, and rotates at a suitably reduced speed in relation to the speed of the shaft of the motor, through the provision of said gearing, and said stub shaft is connected by a coupling 42 in driving relation to an elongated, vertically disposed shaft 44 extending (see Figure 2) within the framework at one side thereof. Within the upper and lower reel compartments, there are provided at opposite sides of the framework horizontally disposed, transversely extending reel support bars 46, 48 (see Figure 2), each reel support bar 46 having a depending, rectangular extension 50. Rotatably supported at its ends upon the reel support bars of the upper compartment is a reel generally designated 52, and an identically formed reel generally designated at 54 is similarly supported within the lower reel compartment upon the bars 46, 48 of said lower compartment.

Mounted upon the depending extension 50 of the bar 46 of the upper compartment is a bearing 56 for the upper end of the shaft 44, and a similar bearing is provided upon the extension of the corresponding bar of the lower compartment, receiving the intermediate portion of said shaft.

Secured to the midlength portion of the shaft 44, immediately above the lower bearing 56, is a sleeve having worm gear teeth 58, for the purpose of driving the lower reel, and a similar worm gear 60 is secured to the upper end of the shaft 44.

Since the formation of the respective reels, and their mounting within their associated compartments, are identical in all respects, the description of the reels to be provided hereinafter will be confined to the reel 52, it being understood that the lower reel 54 will be identically formed and mounted.

Figure 2:
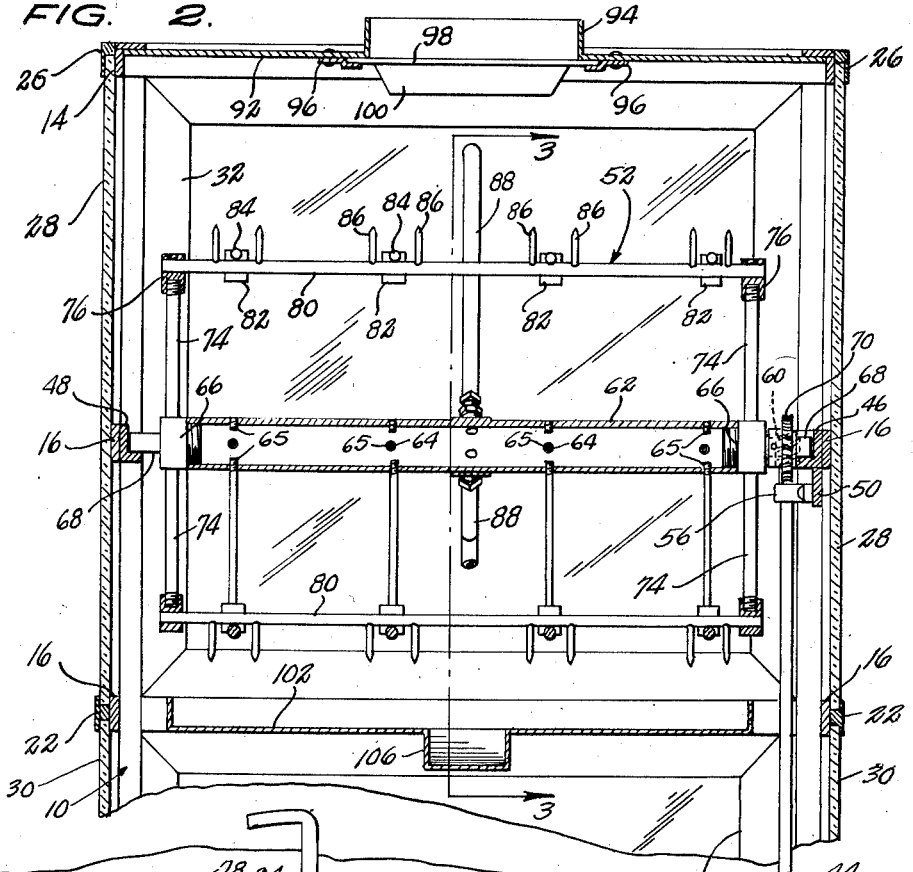
Figure 2 is an enlarged vertical sectional view on line 2—2 of Figure 1.
Figure 3:
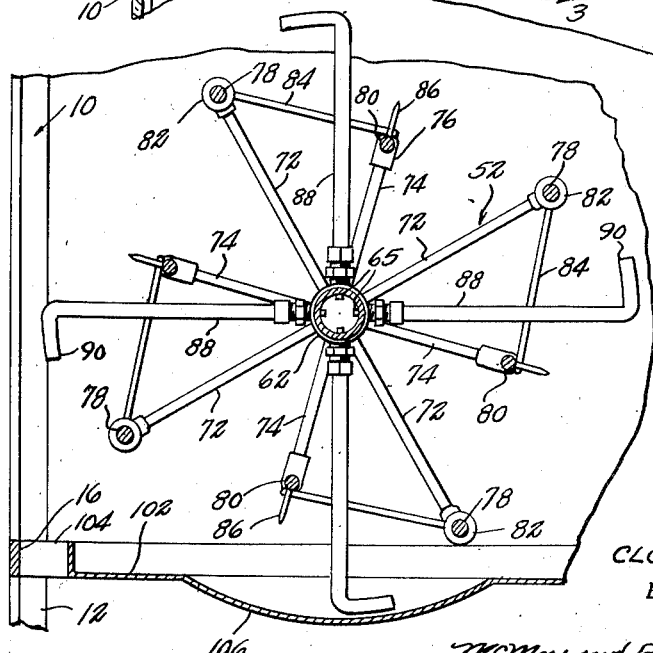
Figure 3 is a vertical sectional view on line 3—3 of Figure 2.

The reel 52, as shown in Figures 2 and 3, is provided with a hollow shaft 62 extending transversely within the upper reel compartment. The shaft is formed at uniformly spaced locations along its length with perforations 64, in each of which is mounted a short piece of tubing which, in a commercial embodiment, would probably project inwardly within the hollow shaft no more than one-fourth of an inch. The purpose of the short lengths of tubing 65 is to permit accumulation of basting juices in the hollow shaft 62 to a suitable level, before said juices flow out of the shaft in a manner to be made presently apparent. At each location along the length of the shaft 62 where the perforations 64 are provided, the perforations are arranged in a circumferential series, and may as shown be spaced 90 degrees apart in each series.

The opposite ends of the hollow shaft 62 are internally threaded to receive the complementarily threaded, reduced inner end portions of plugs 66, and extending within openings provided within said plugs are stub shafts 68, connected to the hubs for rotation therewith and supported in upwardly opening bearing recesses provided in the support bars 46, 48 respectively, to facilitate the bodily removal of the reel. Secured by a set screw or equivalent means to one of the stub shafts 68 is a gear 70 in mesh with the worm 60, to provide a driving connection between the shaft 44 and the reel. It will be understood that whenever the reel is removed, the gear 70 moves out of mesh with the worm 60, and similarly, the driving connection is reestablished whenever the reel is reinserted in the associated compartment.

Integral or otherwise made rigid with each hub 66 is a series of spokes 72 (see Figure 3), these projecting radially, outwardly from the shaft and being spaced 90 degrees apart about the axis of shaft rotation. Alternating with the spokes 72 are shorter spokes 74, also spaced 90 degrees apart about the axis of rotation of the shaft, and equidistantly spaced from the several spokes 72.

To the outer ends of the several spokes there are threadedly connected heads 76, and detachably and fixedly engaged in the heads of the spokes are rods 78, 80 extending between corresponding spokes 72, 74 respectively in parallelism with the axis of rotation of the hollow shaft.

To each of the rods 80, at intervals spaced uniformly along the length thereof (see Figure 2), there are connected, by set screws or equivalent means, collars 82, and fixedly connected to said collars are impaling prongs 84, each of which is of a length to permit the same to extend fully to the adjacent rod 80. Carried by said adjacent rod 80, at intervals spaced along the length thereof correspondingly to the intervals between the rods, are pairs of short impaling prongs or pins 86, the pins of each pair being disposed at opposite sides of the associated prong 84.

By loosening the set screws of the collars, the prongs 84 can be swung about the associated rods 78, to permit a fowl, ham, or other food to be impaled upon the prong 84. Thereafter, the prong 84 is swung back to the position thereof shown in Figure 3, and this causes the food to be also impaled upon the pins, which extend perpendicularly to the length of the prongs when the prongs are in positions resting at their free ends upon the rods 80. This causes the food to be securely locked or clamped in position upon the reel, against slippage, during the cooking process.

Secured fixedly to the midlength portion of the hollow shaft 62 are radially, outwardly extending basting tubes 88, angularly spaced about the axis of rotation of the reel 90 degrees apart, and terminating at their outer ends in laterally projecting extensions 90, adapted to scoop up basting juice in a manner to be made presently apparent, for flow of said juice through the tubes 88 into the hollow shaft.

At the upper end of the framework, there is provided a cover plate 92 which would be suitably insulated, and this has a center opening flanged upwardly as at 94, through which the hot products of combustion pass after heating the foods within the device. To provide for a full or partial closing of the opening 94 there are mounted upon the underside of the top plate 92 (see Figure 5) parallel guide flanges 96, disposed at opposite sides of the opening 94, and slidably engaged along its opposite side edges within the guide grooves defined by the flanges 96 is a flat, rectangular closure plate 98 equipped at one end with a depending flange 100 to provide a handle. The plate 98 permits an adjustable closing of the opening 94, as will be apparent, according to the needs of the particular situation.

Referring now to Figure 4, and also to Figures 2 and 3, providing a bottom for the upper compartment is a basting pan 92, upwardly flanged through its full periphery, said periphery being spaced inwardly from the walls of the transparent housing of the reels by means of short connecting bars 104 disposed at the corners of the basting pan and secured fixedly to selected cross braces 16. The purpose of spacing the edges of the basting pan inwardly from the walls of the device is to provide for a free flow of the hot products of combustion from the lower to the upper compartment, after passage of said hot products past the food being cooked in the lower compartment.

Centrally formed in the basting pan 102 is an arcuate depression 106, the arcuate wall of which is concentric with the axis of rotation of the upper reel, and during rotation of the upper reel, the lateral extensions 90 at the outer ends of the tubes 88 pass through said depression 106. The bottom of the basting pan may be gently sloped inwardly from the periphery thereof to said depression, so as to provide for a free flow of the basting juices to the depression 106, which constitutes a sump for said basting juices.

At the lower end of the device, above the motor 40, there is provided a charcoal pan 108, in which charcoal, hickory wood, or other fuel will be disposed, to provide the heat necessary for cooking the foods impaled upon the prongs of the respective reels. Below said charcoal pan, there would preferably be provided, in a commercial embodiment, a gas or electric heating element, and this can be thermostatically controlled so that before or after the charcoal or hickory fire has achieved its full intensity, a uniform heat will be supplied, to insure a proper cooking of the food in relation to the speed of rotation of the reels. This is believed sufficiently within the skill of those working in the art as not to require special illustration herein.

In use, the reels can be bodily removed, so that selected food items can be secured in place thereon, after which the reels may be returned to the positions thereof shown in the several figures of the drawing. Alternatively, the food can be applied to the reels with the reels remaining in place, as desired. In any event, with the items of food attached by means of the prongs 84, 86 to the reels, the motor is placed in operation, and heat is fed upwardly through the device from the charcoal fire and/or gas or electric heating elements. The heat impinges upon the food as the reels slowly turn, causing the same to be uniformly subjected to the heat, at all sides of the food, to assure tasty, flavorful cooking thereof to the proper depth. The heat, after it passes the lower reel, moves to the upper reel compartment, and after impinging upon the food carried by the upper reel, passes through the outlet 94.

It will be understood, in this regard, that above the heat-producing means, a basting pan similar to that shown in Figure 4 would be provided, for the lower reel, with the lower basting pan being spaced inwardly at its periphery from the walls of the device to assure free flow of heat from the heat-producing means to the lower reel compartment.

As the reels slowly rotate, juices dropping from the food falls to the basting pans, and thence into the sumps or depressions 106. During rotation of the reels, the lateral extensions pass in succession through said sumps, scooping up the basting juices. As each tube 88, after having scooped up basting juice from the sump, moves above the axis of rotation of the reel, the scooped juices flow inwardly within the tubes 88 into the hollow shaft, with which the tubes 88 are in communication. Thereafter, the juices flow longitudinally of the shaft at opposite directions, and due to the provision of the short, radially, inwardly projecting tubes 65, said juices are permitted to accumulate within the hollow shaft to the level of the outer ends of the tube 65. Thereafter, the juices gravitate through the tubes 65, dripping from the shaft to the basting pan, and the cycle is repeated. The self-basting operation is accomplished, it should be noted, without requirement of relatively movable parts as regards the basting means and reel, and of course, the tubes can be removed from the hollow shaft whenever desired for the purpose of facilitating cleaning of said tubes and also of the hollow shafts.

If desired, the sump shaft 68 could be a single shaft extending longitudinally of the shaft 62, axially thereof, and in either event, the shaft or shafts 68 would be removable to facilitate cleaning of the interior of the hollow shaft 62.

The bodily removal of each reel from its associated part would of course not only facilitate cleaning, maintenance, or the attachment or detachment of food as regards each reel, but also exposes the interior of each compartment to similarly permit cleaning thereof. Still further, the removed reel, with the food items attached, can be stored without removal of the food items, and each item can be individually removed without disturbing the remaining pieces of food carried by the reel.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a barbecuing machine, a reel support means; a shaft journalled at its ends upon said means; means for rotating the shaft; spokes projecting radially, outwardly from said shaft at uniformly spaced intervals about the axis of rotation of the shaft; rods connected between said spokes in parallel relation to the axis of rotation of the shaft; prongs connected to and projecting radially, outwardly from some of said rods and adapted for adjustment about the lengths of their associated rods into engagement with the remaining rods, said prongs being adapted to penetrate an item of food to be supported upon the reel; and prongs fixedly secured to and projecting radially, outwardly from the remaining rods, said remaining rods being disposed in alternating relation to the rods supporting the first named prongs and the second named prongs being extended in substantially perpendicular relation to the first named prongs when the first named prongs are swung into engagement with the rods supporting the second named prongs, thus to impale each item of food upon the first and second named prongs.

2. In a barbecuing machine, a reel support means; a shaft journalled at its ends upon said means; means for rotating the shaft; spokes projecting radially, outwardly from said shaft at uniformly spaced intervals about the axis of rotation of the shaft; rods connected between said spokes in parallel relation to the axis of rotation of the shaft; prongs connected to and projecting radially, outwardly from some of said rods and adapted for adjustment about the lengths of their associated rods into engagement with the remaining rods, said prongs being adapted to penetrate an item of food to be supported upon the reel; and prongs fixedly secured to and projecting radially, outwardly from the remaining rods, said remaining rods being disposed in alternating relation to the rods supporting the first named prongs and the second named prongs being extended in substantially perpendicular relation to the first named prongs when the first named prongs are swung into engagement with the rods supporting the second named prongs, thus to impale each item of food upon both the first and second named prongs, the second named prongs being arranged in pairs with the prongs of each pair being disposed at opposite sides of one of the first named prongs.

3. In a barbecuing machine, a reel support means; a shaft journalled at its ends upon said means; means for rotating the shaft; spokes projecting radially, outwardly from said shaft at uniformly spaced intervals about the axis of rotation of the shaft; rods connected between said spokes in parallel relation to the axis of rotation of the shaft; prongs connected to and projecting radially, outwardly from some of said rods and adapted for adjustment about the lengths of their associated rods into engagement with the remaining rods, said prongs being adapted to penetrate an item of food to be supported upon the reel; and prongs fixedly secured to and projecting radially, outwardly from the remaining rods, said remaining rods being disposed in alternating relation to the rods supporting the first named prongs and the second named prongs being extended in substantially perpendicular relation to the first named prongs when the first named prongs are swung into engagement with the rods supporting the second named prongs, thus to impale each item of food upon both the first and second named prongs, the second named prongs being arranged in pairs with the prongs of each pair being disposed at opposite sides of one of the first named prongs, the connection of said first named prongs to their associated rods being adapted for holding the first named prongs against movement about the first named rods in selected positions to which said first named prongs are adjusted thereupon.

References Cited in the file of this patent

UNITED STATES PATENTS

| | | |
|---|---|---|
| 2,182,225 | Garvis | Dec. 5, 1939 |
| 2,399,163 | Brunamonti | Apr. 30, 1946 |
| 2,577,184 | Dietrich | Dec. 4, 1951 |
| 2,701,516 | Dorsey | Feb. 8, 1955 |
| 2,710,575 | Overman | June 14, 1955 |

FOREIGN PATENTS

| | | |
|---|---|---|
| 127,247 | Germany | Dec. 22, 1900 |